United States Patent [19]
Everett

[11] 3,851,634
[45] Dec. 3, 1974

[54] FUEL INDUCTION SYSTEM FOR INTERNAL COMBUSTION ENGINE

[76] Inventor: Vernon M. Everett, 13128 Vallecito Ave., Beaumont, Calif. 92223

[22] Filed: June 20, 1973

[21] Appl. No.: 371,732

[52] U.S. Cl. .......... 123/133, 48/180 R, 123/122 AC
[51] Int. Cl. ............................................ F02m 17/18
[58] Field of Search.... 123/122 AC, 122 H, 52 MV, 123/141, 133; 48/180 R

[56] References Cited
UNITED STATES PATENTS

| | | | |
|---|---|---|---|
| 1,990,662 | 2/1935 | Moore | 123/127 AC |
| 2,342,132 | 2/1944 | Farrell | 123/133 |
| 2,977,205 | 3/1961 | Austin | 123/141 |
| 3,085,869 | 4/1963 | Benes | 123/141 |

FOREIGN PATENTS OR APPLICATIONS

| | | | |
|---|---|---|---|
| 563,895 | 9/1944 | Great Britain | 123/122 AC |

*Primary Examiner*—Charles J. Myhre
*Assistant Examiner*—R. H. Lazarus
*Attorney, Agent, or Firm*—Herbert E. Kidder

[57] ABSTRACT

A device interposed between the carburetor and intake manifold for converting the wet spray of gasoline droplets suspended in air into a thoroughly mixed, dry, gaseous vapor for good combustion. The wet fuel/air mixture from the carburetor passes downwardly through spin vanes that cause the mixture to spin at high velocity, throwing liquid fuel droplets outwardly against the wall of a surrounding bowl. The bowl wall is heated by exhaust gas, and liquid droplets are vaporized as they impinge against it. Spinning of the mixture is further accelerated by jets of air and exhaust gas directed tangentially into the bowl directly below the spin vanes. Cam-controlled needle valves in the nozzles regulate the flow of air or exhaust gas through the nozzles to suit the requirements, the cams being connected to the throttle linkage. At the bottom of the bowl, the mixed fuel vapor and air turns inwardly and is drawn upwardly through an inverted horn, from which it is distributed to the intake manifold. The jets of hot exhaust gas contribute heat for vaporization of liquid fuel droplets, and also reduce formation of nitrogen oxides.

10 Claims, 7 Drawing Figures

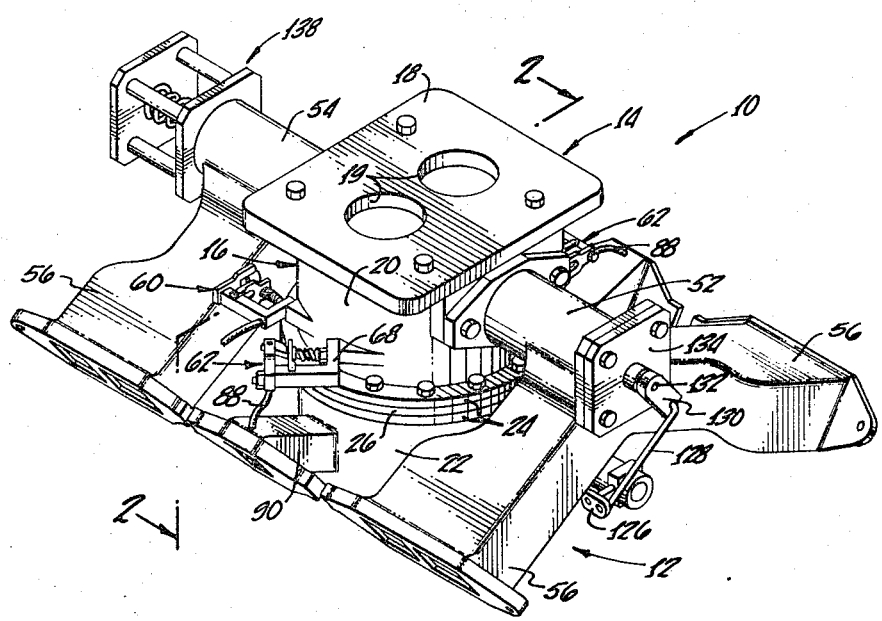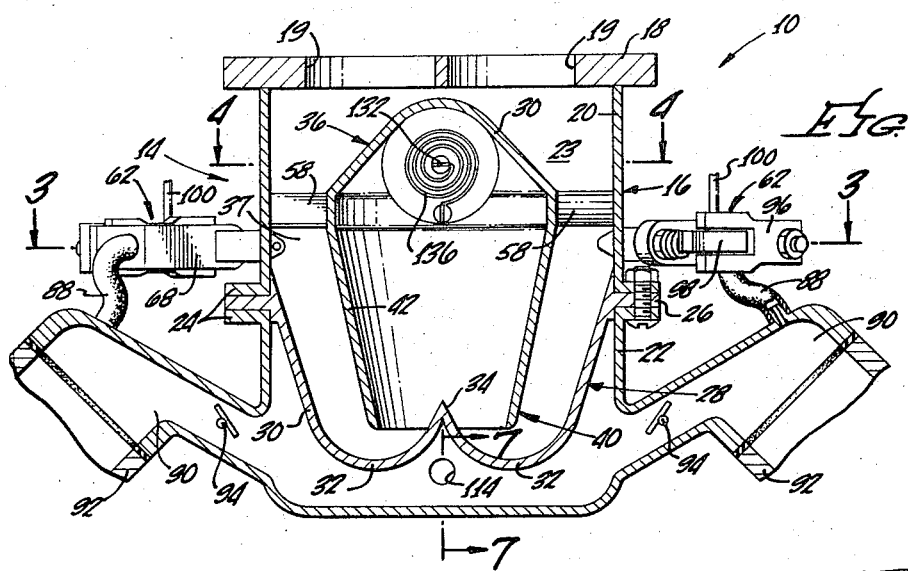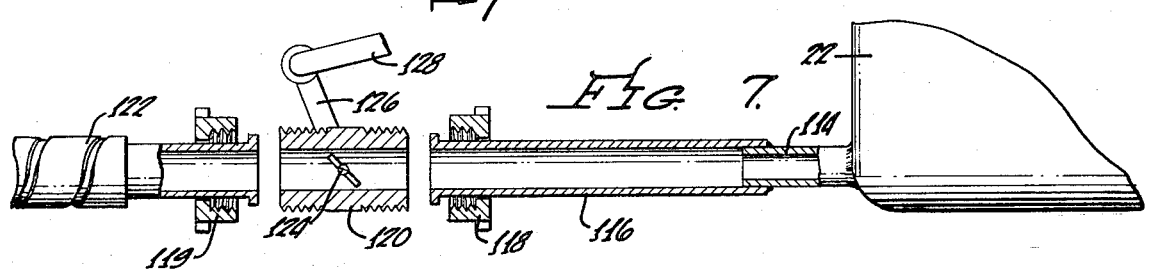

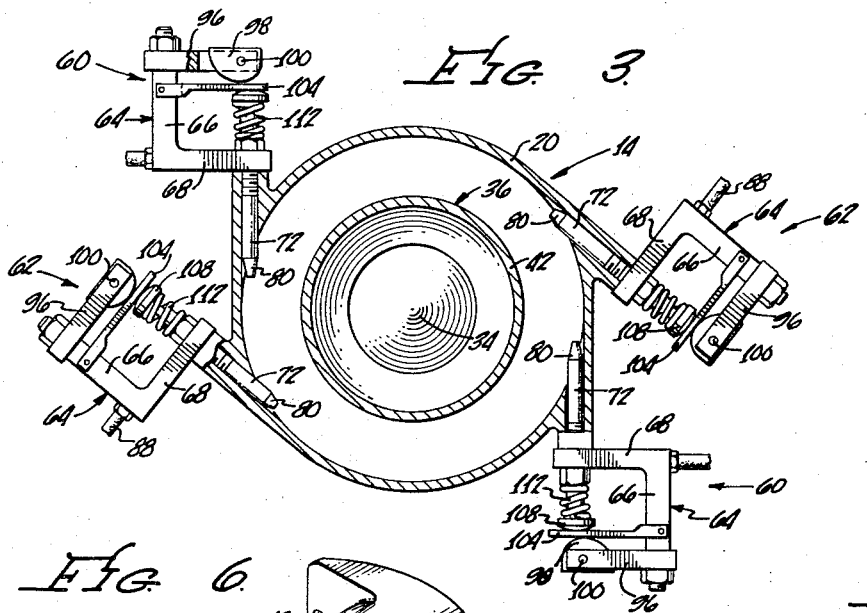

3,851,634

FUEL INDUCTION SYSTEM FOR INTERNAL COMBUSTION ENGINE

BACKGROUND OF THE INVENTION

The present invention pertains to fuel induction systems for internal combustion engines, and more particularly to a device for converting the wet mixture consisting of liquid gasoline droplets suspended in air, into a dry, gaseous mixture of fuel vapor and air which is thoroughly mixed for good combustion.

One of the chief disadvantages of the carburetor is that it merely breaks the liquid gasoline up into tiny droplets which are suspended in the intake air as the mixture is drawn through the manifold and into the cylinders. While some vaporization takes place, there is still a substantial proportion of liquid fuel droplets in the cylinder head at the time the mixture is ignited by the spark. Liquid fuel droplets do not burn efficiently, and as a result, the exhaust gas contains an excessive amount of unburned hydrocarbons and carbon monoxide (CO) as pollutants, which are partially responsible for atmospheric smog. Nitrogen oxide is also formed as a product of the high combustion temperature, particularly as the exhaust gases leave the exhaust port during the first few degrees of valve opening. At this point, minute droplets of liquid fuel that have not yet burned become vaporized by the heat of combustion, mix with the remaining oxygen, and the mixture turns in a delayed combustion at an exceedingly high temperature as the gases pass between the face of the valve and the valve seat. It is the high temperature of this delayed action combustion of the exhaust gases that produces the greater part of the nitrogen oxide.

SUMMARY OF THE INVENTION

The primary object of the present invention is to provide an apparatus that overcomes all of the above-mentioned deficiencies of conventional carburetors, and provides a fuel induction system that completely vaporizes all of the discrete droplets of liquid fuel, forming a dry, gaseous, intimate mixture of fuel vapor and air that is in optimum condition for clean, complete combustion during the power stroke, so that all of the heat content of the fuel is utilized in the production of power. Among the advantages derived from the present invention are: increased engine efficiency, more horsepower output, better mileage per gallon of gas, better performance, lower engine operating temperature, and reduced pollutants in the exhaust, said pollutants being reduced almost to the vanishing point, with unburned hydrocarbons practically non-existent. The lower engine operating temperature is due to more complete combustion, which takes place entirely during the power stroke. The result is cooler exhaust, less production of nitrogen oxides, and a cooler-running engine.

These and other objects and advantages of the invention will become apparent to those skilled in the art from the following detailed description of the preferred embodiment thereof, with reference to the accompanying drawings.

BRIEF DESCRIPTION OF THE DRAWINGS

FIG. 1 is a perspective view of a fuel induction system embodying the invention, the carburetor having been removed for this purpose of clarity;

FIG. 2 is an enlarged cross-sectional view through the same, taken at 2—2 in FIG. 1;

FIG. 3 is a horizontal sectional view through the fuel vaporizing device of the invention, taken at 3—3 in FIG. 2;

FIG. 4 is a sectional view taken at 4—4 in FIG. 2;

FIG. 5 is an enlarged, fragmentary, partially cut-away view through one of the injectors, showing its internal construction;

FIG. 6 is a perspective view of the diffuser, which is contained within the housing; and FIG. 7 is an exploded fragmentary sectional view, taken at 7—7 in FIG. 2.

DESCRIPTION OF THE PREFERRED EMBODIMENT

The drawings show a fuel induction system for a V-8 gasoline engine, except for a carburetor, which has been removed for the sake of clarity. The fuel system is designated in its entirety by the reference numeral 10, and includes an intake manifold 12 which is adapted to be bolted to the intake ports of the cylinder heads, together with a fuel vaporizing device 14, that is the heart of this invention. The device 14 includes a housing 16 having a horizontal mounting flange 18 at the top, upon which the carburetor (not shown) is mounted. The mounting flange 18 has two openings 19 which register with the two throats of a two-barrel carburetor.

Housing 16 is made up of upper and lower housing bodies 20 and 22, both of which are generally cylindrical in configuration, and enclose a chamber 23. Projecting radially outward from the adjacent edges of the housing bodies 20, 22 are flanges 24 which clamp against opposite sides of an intermediate radial flange 26 projecting outwardly from the upper portion of a heat exchange bowl 28.

The heat exchange bowl 28 extends down into the lower housing body 22 and occupies most of the space therein. Bowl 28 has downwardly converging side walls 30 that merge into a smoothly rounded bottom 32, which turns into an upwardly projecting conical tip 34, pointing up into the opening of a diffuser 36.

Diffuser 36 is best shown in FIGS. 2 and 6, and occupies the center of chamber 23, forming an annular passageway 37 between the outer surface of the diffuser and the inner surface of the chamber bodies 20, 22. The top of the diffuser is formed by a downwardly-facing top end 38, having a generally parabolic cross-sectional configuration, with the outer edges thereof merging and becoming an inverted horn 40 that is open at the bottom. The horn 40 has sides 42 that converge downwardly with an included angle of about 20°, as shown in FIG. 2. The bottom end of the horn 40 is elevated a short distance above the bottom 32 of bowl 28, so that the fuel-air mixture flowing downwardly between the diffuser side walls 42 and bowl side walls 32 is turned inwardly and upwardly, and enters the horn at the bottom end thereof.

At the top end of the diffuser 36 are two tubular passageways 44 projecting horizontally in opposite directions, which communicate with the interior of the diffuser at the top end therof. Each of the passageways 44 has a cylindrically curved end flange 46 (see FIG. 4) which fits snugly against the cylindrical inside surface of the housing body 20, and formed in the flanges 46 on opposite sides thereof are tapped holes 48, to receive screws 50 which join the diffuser to the upper housing body 20 and manifold pipes 52 and 54. Manifold pipes 52, 54 extend horizontally outward from opposite sides of the housing 16, and connected to their outer ends are manifold branches 56, with separate ports for the respective cylinders.

Diffuser 36 also has a plurality of angularly spaced, radially projecting turbine blades 58, which twist so as to deflect the incoming fuel-air mixture and impart a high velocity spin thereto as it travels downwardly through the annular passageway 37. The high velocity spin given to the fuel-air mixture is important, because it causes the tiny droplets of liquid fuel suspended in the air to be thrown outwardly by centrifugal force against the side walls 30 of the heat exchange bowl 28. The walls of the heat exchange bowl 28 are heated to an elevated temperature, well above the vaporization point of the gasoline or other liquid fuel, using exhaust gas heat, as will be explained presently.

Directly below the turbine blades 58 on opposite sides of the upper housing 20 are two air injectors 60, and spaced angularly from each of these is an exhaust gas injector 62. The injectors 60 and 62 inject high velocity jets of air and exhaust gas, respectively, into the air-fuel mixture in the same direction as the direction of spin. The jets are substantially tangential to the angular passageway 37, and the kinetic energy of the jets is utilized to accelerate the swirling spin of the fuel-air mixture as it travels down through the annular passageway. Each of the injectors is substantially identical to the exhaust gas injector 62 shown in FIG. 5, and the following description of the one is therefore considered to apply to all four of them. The injector has an L-shaped frame 64 having two perpendicular legs 66 and 68, the latter having a hole 70 drilled through its outer end through which a tubular nozzle 72 is inserted, said nozzle being threaded at 74 to screw into a tapped hole in the side wall of the upper housing body 20. A shoulder on the nozzle abuts against the top of the leg 68 to clamp the frame 64 to the housing body. Nozzle 72 has an internal bore 76, which terminates in an outlet opening 78 in a tapered nose 80.

Drilled through the sides of the tubular nozzle 72 are intake ports 82 which open into a passageway 84 drilled through the center of frame leg 68. At its outer end, passageway 84 is threaded internally to receive a nipple 86, to which tubing 88 is attached. In the case of the air injectors 60, the tubing 88 is connected to the inside of the air cleaner, above the carburetor, while each of the exhaust gas injectors 62 has its tubing 88 connected to the adjacent exhaust gas cross-over passage 90, the said cross-over passages 90 being joined to special exhaust ports 92 provided on the inner side of the cylinder heads to supply exhaust heat for the carburetor manifold. The exhaust gas cross-over passages 90 open into the bottom end of the lower housing body 22 below the heat exchange bowl 28, and hot exhaust gas enters this space between the bowl 28 and lower housing body 22, alternately from opposite sides, as the exhaust gas is discharged from cylinders in opposite banks of the engine. Butterfly valves 94 may be used to control the rate of flow of the exhaust gas into the housing, although this may not be necessary.

Mounted on the outer end of each of the injector frame arms 66 is a yoke 96 which extends parallel to leg 68, with its outer end overhanging the end of the nozzle 72. The outer end of the yoke 92 is bifurcated to receive a cam 98, which is mounted on a shaft 100. Shaft 100 passes through bearing openings in opposite sides of the bifurcated arm 96, and mounted on one end thereof is an actuating lever arm 102 which is connected by suitable linkage to the throttle control linkage of the carburetor.

Cam 98 acts against a pressure plate 104 which is pivoted at 106 to the frame leg 66. Cam 98 rubs against the top side of pressure plate 104, and the bottom surface of the pressure plate bears downwardly against a head 108 formed at the top end of a needle valve 110 extending down through the bore 76 in nozzle 72. A compression spring 112 bears upwardly against the underside of heat 108 to hold the latter against the pressure plate. Thus, side thrust due to friction of the cam 98 rubbing against the pressure plate is taken back to the frame leg 66 by pivot pin 106, and only downward thrust is exerted against the needle valve 110, when the cam is rotated. At the downward extremity of its travel, the bottom end of needle valve 110 closes the outlet opening 78 of the nozzle, thereby preventing any exhaust gas or air from being injected into the air-fuel mixture.

Opening into the lower housing body 22 near the bottom end thereof, is a tubular nipple 114, which is connected by tubing 116 and connector fittings 118, 119 and 120 to a flexible conduit 122 going to the exhaust system of the automobile, so that the exhaust gas is carried off with the main bulk of the exhaust gas discharged by the engine. Connector fitting 120 may have a butterfly valve 124 provided therein, which is controlled by an arm 126, and the latter is connected by a link 128 to another arm 130 projecting radially from a shaft 132. Shaft 132 projects from the center of an endplate 134 mounted on the outer end of manifold pipe 52, and the inner end of the shaft has a bi-metal thermostat coil 136 attached thereto, which coils or uncoils responsive to temperature changes within the interior of the intake manifold. Thus, if the temperature of the fuel-air mixture in the manifold tends to rise too high, the thermostat coil 136 causes the shaft 132 to turn in the appropriate direction to close the butterfly valve 124, thereby stopping the circulation of hot gas through the lower housing body 22. With the flow of hot exhaust gas thus restricted, the heat exchange bowl 28 cools off somewhat, allowing the temperature of the fuel-air mixture to lower to whatever predetermined temperature the thermostat coil 136 has been set for.

Mounted on the outer end of the other manifold pipe 54, is a spring-loaded pressure relief valve 138, which is normally held closed at all times, but is free to open instantly with a sudden increase in pressure in the manifold, such as might occur with a backfire.

The operation of the invention is believed to be more-or-less self-evident from the foregoing description. The wet fuel-air mixture leaving the carburetor enters the top end of the housing 16 and passes down through the openings 19 into the annular passageway 37, and through turbine blades 58. The blades 58 impart a high velocity spin to the mixture, and this rotational spin is augmented and accelerated by high velocity jets of exhaust gas and air injected tangentially into the annular passageway 37. The linkages to the cams 98 on the air injectors 60 and exhaust gas injectors 62 are adjusted so that when the carburetor is throttled back at low engine speed, the air injector nozzles are open and the exhaust gas injector nozzles are closed. The intake manifold pressure at idling speed is considerably less than atmospheric pressure, and this pressure difference causes high-velocity jets of air to be injected into the fuel-air mixture during low-speed operation of the engine. As the throttle is advanced and engine speed is increased, the air injectors 60 are gradually closed by their cams 98, and the exhaust gas injectors 62 are gradually opened. At the same time, the difference between atmospheric pressure and the intake manifold pressure becomes less as engine speed increases, which further reduces the volume and velocity of air jets injected into the fuel-air mixture. As the engine speed increases, the exhaust gas pressure in the exhaust manifold increases, at the same time that the cams 98 are opening the needle valves of the exhaust gas injectors 62. Thus, as high engine speeds, e.g., at half-throttle or more, the exhaust gas injectors 62 are injecting high-velocity jets of exhaust gas into the fuel-air mixture, while the air injectors 60 are closed, or substantially so. The hot exhaust gas jets have two other functions in addition to accelerating the rotational spin of the fuel-air mixture in the annular passageway 37: (1) the heat of the exhaust gas contributes heat to help vaporize the droplets of liquid fuel carried by the air stream; and (2) the exhaust gas that is recycled back through the engine acts to dilute the air-fuel mixture, and this lowers combustion temperatures, thereby reducing the formation of oxides of nitrogen. This exhaust gas recirculation principle is well-known in the art, as a means for reducing the amount of oxides of nitrogen in automobile exhaust.

The high velocity spin imparted to the fuel-air mixture by the turbine blades 58 and air or exhaust injectors 60, 62 causes the liquid droplets of fuel to be thrown outwardly against the hot side walls of the heat exchange bowl 28. Contact of the liquid fuel with the hot wall 30 causes the liquid to vaporize into a dry gas, which then mixes intimately with the air due to the turbulent swirling action of the fuel-air mixture as it continues moving downwardly to the bottom of the bowl and then rises through the horn 40. The hot fuel-air mixture gives up some of its heat to the walls of the diffuser 36, thereby preventing formation of ice during freezing conditions. Finally, the warm, dry fuel-air mixture leaves the diffuser 36 through the tubular passageways 44 and manifold pipes 52, 54, to pass through the manifold branches 56 into the engine cylinders.

As a result of the complete vaporization of all of the liquid fuel droplets, the fuel-air mixture burns completely and cleanly, in much the same way as liquid propane, leaving no unburned hydrocarbons and virtually no carbon monoxide in the exhaust gas. Nitrogen oxides are also reduced to acceptable levels, partially as a result of the exhaust gas recirculation which occurs when the exhaust gas injectors are open. The effectiveness of the present invention in reducing exhaust gas pollutants was proven by tests, in which the exhaust produced by a V-8 automobile engine using the present invention was compared with the exhaust produced by the same engine, using a conventional carburetor adjusted for most efficient operation. The results are as follows:

|  | Unburned hydrocarbons | Carbon Monoxide | Nitrogen Oxides |
|---|---|---|---|
| Carburetor |  |  |  |
| Present invention |  |  |  |

Engine power was also increased when the present invention replaced the conventional carburetor, and the exhaust gas was much cooler. Both at low idling speed and at high speed, the engine ran smoothly and without any detonation.

While I have shown and described in considerable detail what I believe to be the preferred form of my invention, it will be understood by those skilled in the art that the invention is not limited to such details, but might take various other forms within the scope of the following claims.

What I claim is:

1. A fuel induction system for an internal combustion engine, including an intake manifold, a carburetor attached to said manifold, and a fuel-vaporizing device interposed between said carburetor and said manifold, said device comprising:

a housing forming an enclosed chamber that is connected at the top to said carburetor to receive the fuel-air mixture therefrom;

a diffuser mounted within said chamber and cooperating with the latter to define a passageway between the diffuser and said housing, said diffuser including an inverted horn that is open at the bottom;

means for imparting a high-velocity spin to said fuel-air mixture as the latter moves downwardly through said passageway;

a heat-exchange bowl mounted within said housing, surrounding the lower portion of said diffuser and extending under said horn at a distance therefrom, said heat-exchange bowl having a rounded bottom that directs the spinning fuel-air mixture in toward the center and up into the bottom end of said inverted horn;

means for heating said heat-exchange bowl to a temperature well above the vaporization point of the fuel;

the minute droplets of liquid fuel suspended in the fuel-air mixture received from said carburetor being thrown outwardly by centrifugal force against the inner surface of said heat-exchange bowl due to the high velocity spin of the mixture, and said liquid droplets being vaporized by contact with the hot wall of the heat-exchange bowl, the vaporized fuel and air being intimately mixed by the turbulent swirling motion of the mixture as it reaches the bottom of the bowl and is turned inwardly and up into the open end of said horn; and means for distributing the dry, gaseous fuel vapor and air mixture from said diffuser to said intake manifold.

2. The apparatus of claim 1, wherein said passageway between said diffuser and said housing is annular, and said means for imparting a high-velocity spin to said fuel-air mixture comprises a plurality of turbine blades extending radially from the sides of the diffuser.

3. The apparatus of claim 1, wherein said means for heating said heat-exchange bowl comprises a second passageway provided between the outside of the bowl and the inside of said housing, and means for circulating hot fluid through said second passageway so as to heat the walls of the bowl.

4. The apparatus of claim 3, wherein said hot fluid used for heating said bowl consists of exhaust gas derived from the engine, and means is provided for removing the exhaust gas from said second passageway.

5. The apparatus of claim 1, which further includes nozzles for injecting high velocity jets of air tangentially into said fuel-air mixture as it passes through said passageway.

6. The apparatus of claim 1, plus valve means actuated by the throttle linkage for regulating the flow of air through said nozzles.

7. The apparatus of claim 1, which further includes nozzles for injecting high velocity jets of hot exhaust gas tangentially into said fuel-air mixture as it passes through said passageway; and valve means for controlling the rate of flow of exhaust gas through the nozzles according to the speed of the engine.

8. The apparatus of claim 1, which further includes a plurality of angularly spaced nozzles on said housing, some of said nozzles injecting high velocity jets of air tangentially into said fuel-air mixture as it passes through said passageway, and others of said nozzles injecting jets of hot exhaust gas into said fuel-air mixture; and valve means actuated by the throttle linkage for regulating the flow of air and exhaust gas through the respective nozzles.

9. The apparatus of claim 4, which further includes a thermostatically controlled valve for regulating the flow of hot exhaust gas through said second passageway.

10. The apparatus of claim 2, wherein said hot fluid used for heating said bowl consists of exhaust gas derived from the engine, with thermostatically controlled valve means for regulating the flow of hot exhaust gas through said second passageway, and which further includes a plurality of angularly spaced nozzles on said housing directly below said turbine blades, some of said nozzles injecting high velocity jets of air tangentially into said fuel-air mixture in the direction of spin as the mixture passes through said annular passageway, and others of said nozzles injecting jets of hot exhaust gas into said fuel-air mixture in the direction of spin; and valve means connected to the throttle linkage for regulating the flow of air and exhaust gas through the respective nozzles.

* * * * *